(12) United States Patent
Yanagida et al.

(10) Patent No.: US 7,399,724 B2
(45) Date of Patent: *Jul. 15, 2008

(54) ELECTRONIC DEVICE, DIELECTRIC CERAMIC COMPOSITION AND PRODUCTION METHOD OF THE SAME

(75) Inventors: Miyuki Yanagida, Chuo-ku (JP); Haruya Hara, Chuo-ku (JP); Yasuo Watanabe, Chuo-ku (JP); Akira Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 148 days.

This patent is subject to a terminal disclaimer.

(21) Appl. No.: 11/299,651

(22) Filed: Dec. 13, 2005

(65) Prior Publication Data

US 2006/0128553 A1    Jun. 15, 2006

(30) Foreign Application Priority Data

Dec. 13, 2004  (JP) ............................. 2004-359859
Oct. 31, 2005  (JP) ............................. 2005-317412

(51) Int. Cl.
  *C04B 35/468*  (2006.01)
(52) U.S. Cl. ..................................... 501/139
(58) Field of Classification Search ................ 501/139
  See application file for complete search history.

(56) References Cited

U.S. PATENT DOCUMENTS

| | | | | |
|---|---|---|---|---|
| 4,670,243 A | * | 6/1987 | Wilson et al. ............... | 423/598 |
| 6,544,916 B1 | * | 4/2003 | Sato et al. .................... | 501/137 |
| 6,777,363 B2 | * | 8/2004 | Park et al. .................... | 501/139 |
| 6,828,266 B1 | * | 12/2004 | Park et al. .................... | 501/139 |
| 2007/0232480 A1 | * | 10/2007 | Yanagida et al. ............ | 501/139 |

FOREIGN PATENT DOCUMENTS

| | | | |
|---|---|---|---|
| EP | 0 977 218 A2 | | 2/2000 |
| EP | 1 096 518 A1 | | 5/2001 |
| EP | 1 146 024 A1 | | 10/2001 |
| EP | 1 648 004 A1 | | 4/2006 |
| JP | 197625713 | * | 1/1976 |
| JP | A 8-124785 | | 5/1996 |
| JP | 40-157021 | * | 6/1997 |
| JP | A 2000-348961 | | 12/2000 |
| JP | A 2003-176180 | | 6/2003 |
| WO | 01/25164 | * | 4/2001 |

* cited by examiner

*Primary Examiner*—Karl E Group
(74) *Attorney, Agent, or Firm*—Oliff & Berridge, PLC (57) ABSTRACT

A production method of a dielectric ceramic composition using a reacted material obtained by making a main component including barium titanate react with a fourth subcomponent including an oxide of R (note that R is at least one selected from Y, La, Ce, Pr, Nd, Pm, Sm, Eu, Gd, Tb, Dy, Ho, Er, Tm, Yb and Lu). According to the invention, a dielectric ceramic composition capable of improving the specific permittivity without deteriorating other electric characteristics (for example, a temperature characteristic of the capacitance, insulation resistance, accelerated lifetime of the insulation resistance and dielectric loss), and the production method can be provided.

7 Claims, 1 Drawing Sheet

Fig. 1

ELECTRONIC DEVICE, DIELECTRIC CERAMIC COMPOSITION AND PRODUCTION METHOD OF THE SAME

BACKGROUND OF THE INVENTION

1. Field of the Invention

The present invention relates to a dielectric ceramic composition used as a dielectric layer of an electronic device, such as a multilayer ceramic capacitor, the production method and an electronic device having the dielectric ceramic composition as a dielectric layer.

2. Description of the Related Art a multilayer ceramic capacitor as an example of an electronic device is produced, for example, by printing a predetermined pattern of an internal electrode on a ceramic green sheet comprising a predetermined ceramic composition, stacking them by two or more to form one body, and co-firing a green chip obtained thereby. Since the internal electrode layer of the multilayer ceramic capacitor is fired to be one body with a ceramic dielectric, it is necessary to select a material of not reacting with the ceramic dielectric. Therefore, as a material to compose the internal electrode layer, noble metals, such as platinum and palladium, had to be used in the related art.

However, in recent years, a dielectric ceramic composition capable of using inexpensive base metals, such as nickel and copper, has been developed and a wide reduction of the cost has been realized.

Also, in recent years, demands for downsizing of electronic devices have become high as the electronic circuit becomes high in density, and multilayer ceramic capacitors have rapidly become more compact and larger in capacity. To make the multilayer ceramic capacitor more compact and larger in capacity, a method of making the dielectric layer thinner and a method of increasing a specific permittivity of a dielectric ceramic composition included in the dielectric layer, etc. have been generally used. However, when the dielectric layer is made thin, an electric field imposed on the dielectric layer becomes strong when applying a direct current voltage, so that there has been a problem that change of the specific permittivity over time, that is, change of the capacity over time becomes remarkably large.

To improve the capacity under a direct current electric field over time, a method of using dielectric particles having a small average particle diameter as dielectric particles included in the dielectric layer has been proposed (for example, the Japanese Unexamined Patent Publication No. 8-124785). The Japanese Unexamined Patent Publication No. 8-124785 discloses a dielectric ceramic composition having a specific composition, wherein an average particle diameter of dielectric particles is 0.45 µm or smaller. However, the dielectric ceramic composition disclosed in this article has too low specific permittivity, so that it is difficult to attain downsizing and a larger capacity.

SUMMARY OF THE INVENTION

An object of the present invention is to provide a dielectric ceramic composition capable of improving the specific permittivity without deteriorating other electric characteristics (for example, a temperature characteristic of the capacitance, insulation resistance, accelerated lifetime of the insulation resistance and a dielectric loss). Another object of the present invention is to provide an electronic device, such as a multilayer ceramic capacitor, having a dielectric layer composed of the dielectric ceramic composition as above.

To attain the above objects, according to the present invention, there is provided a production method of a dielectric ceramic composition for producing a dielectric ceramic composition comprising a main component including barium titanate and a fourth subcomponent including an oxide of R (note that R is at least one kind selected from Y, La, Ce, Pr, Nd, Pm, Sm, Eu, Gd, Tb, Dy, Ho, Er, Tm, Yb and Lu), wherein a material of the main component and at least a part of a material of the fourth subcomponent are brought to react in advance, and a reacted material thereby is used.

In the present invention, as a result that a material of the main component and at least a part of a material of the fourth subcomponent are brought to react, the fourth subcomponent can be provided at least inside (at the center portion) of the main component. Therefore, the specific permittivity can be improved without deteriorating other electric characteristics (for example, a temperature characteristic of the capacitance, insulation resistance, accelerated lifetime of insulation resistance and dielectric loss).

In the present invention, preferably, a material of the main component and at least a part of a material of the fourth subcomponent are brought to be in a solid dispersion state in advance. Due to the solid dispersion, the fourth subcomponent can be uniformly solid dispersed in the main component, and the electric characteristics as above can be furthermore improved.

In the present invention, the word "reaction" is used as a concept including solid dispersion and coating, etc. and includes a method for producing a state wherein the fourth subcomponent exists inside (at the center part of) the main component.

The present invention preferably comprises the steps of:

preparing a reacted material obtained by making a material of the main component react with a part of a material of the fourth subcomponent to be included in the dielectric ceramic composition, and adding remaining material of the fourth subcomponent to be included in the dielectric ceramic composition to the reacted material.

In the present invention, a material of the fourth subcomponent to be brought to react with a material of the main component is preferably not all but a part of the fourth subcomponent to be included in the dielectric ceramic composition. Then, the obtained reacted material is preferably added with the remaining fourth subcomponent material, subjected to preliminary firing if necessary, then, firing. Due to that, effects of the present invention can be enhanced.

In the present invention, a content of the fourth subcomponent in the dielectric ceramic composition to be obtained finally is preferably 0.1 to 10 moles and, more preferably, 0.2 to 6 moles in terms of R with respect to 100 moles of the main component.

In the present invention, by setting the content of the fourth subcomponent to be included in the dielectric ceramic composition within the above range, a temperature characteristic of the capacitance can be improved. When the content of the fourth subcomponent is too small, the effect of adding the fourth subcomponent cannot be obtained and a temperature characteristic of the capacitance tends to deteriorate, while when the content is too large, the sinterability tends to decline.

In the present invention, preferably, a content of the fourth subcomponent to be brought to react with a material of the main component in advance is 0 to 0.5 mole (note that 0 is not included) in terms of R with respect to 100 moles of the main component.

Alternatively, in the present invention, a ratio of the fourth subcomponent to be brought to react with a material of the main component in advance is preferably 0 to 50 mol % (note that 0 and 50 are not included) and, more preferably, 0 to 25 mol % (note that 0 is not included) in terms of R with respect to 100 mol % as a total amount of the fourth subcomponent to be finally included in the dielectric ceramic composition.

When an amount of the fourth subcomponent to be brought to react with the main component material is too much, crystal particle diameter of a sintered body to be obtained after firing becomes too large, so that it is liable that the temperature characteristic deteriorates and the insulation resistance (IR) deteriorates.

In the present invention, preferably, the dielectric ceramic composition furthermore comprises a first subcomponent including at least one kind selected from MgO, CaO, BaO and SrO, a second subcomponent including mainly $SiO_2$ and at least one kind selected from MO (note that M is at least one kind selected from Mg, Ca, Ba and Sr), $Li_2O$ and $B_2O_3$, and a third subcomponent including at least one kind selected from $V_2O_5$, $MoO_3$ and $WO_3$; and ratios of the respective subcomponents with respect to 100 moles of the main component are the first subcomponent: 0.1 to 5 moles, the second subcomponent: 0.1 to 12 moles, and the third subcomponent: 0 to 0.3 mole (note that 0 is not included).

In the present invention, preferably, the dielectric ceramic composition furthermore comprises a fifth subcomponent including at least one kind selected from MnO and $Cr_2O_3$, and a ratio of the fifth subcomponent with respect to 100 moles of the main component is 0.05 to 1.0 mole.

In the present invention, as a result that the first to third subcomponent (more preferably, furthermore the fifth subcomponent) in addition to the fourth subcomponent, the temperature characteristic of the capacitance can be improved and, in particular, the X7R characteristics (−55 to 125° C., $\Delta C$=within ±15%) of the EIA standard can be satisfied. Note that adding timing of the first to third and fifth subcomponents is not particularly limited, but it is preferable to them to the reacted material after making the main component material react with at least a part of the fourth subcomponent material.

In the present invention, a material having an average particle diameter of preferably 0.05 to 0.5 µm and more preferably 0.1 to 0.4 µm is used as the main component material. By using a main component material having an average particle diameter in the above range, an average crystal particle diameter of dielectric particles after sintering can be made as fine as preferably 0.1 to 0.3 µm, so that changes of the specific permittivity over time can be reduced.

A dielectric ceramic composition according to the present invention is produced by any one of the methods described above.

An electronic device comprises a dielectric layer composed of the dielectric ceramic composition described above. The electronic device is not particularly limited and a multilayer ceramic capacitor, piezoelectric device, chip inductor, chip varistor, chip thermistor, chip resistor, and other surface mounted chip electronic devices (SMD) may be mentioned.

According to the present invention, since the main component material and at least a part of the fourth subcomponent material are brought to react in advance, it is possible to provide a dielectric ceramic composition capable of improving the specific permittivity without deteriorating other electric characteristics (for example, a temperature characteristic of the capacitance, insulation resistance, accelerated lifetime of the insulation resistance and dielectric loss), and the production method. According to the present invention, furthermore, it is possible to provide electronic devices such as multilayer ceramic capacitor having dielectric layers composed of dielectric ceramic composition described above.

BRIEF DESCRIPTION OF DRAWINGS

These and other objects and features of the present invention will become clearer from the following description of the preferred embodiments given with reference to the attached drawing, in which.

DESCRIPTION OF THE PREFERRED EMBODIMENT

Below, embodiments of the present invention will be explained in detail based on the drawing.

Multilayer Ceramic Capacitor 1

Figure 1:
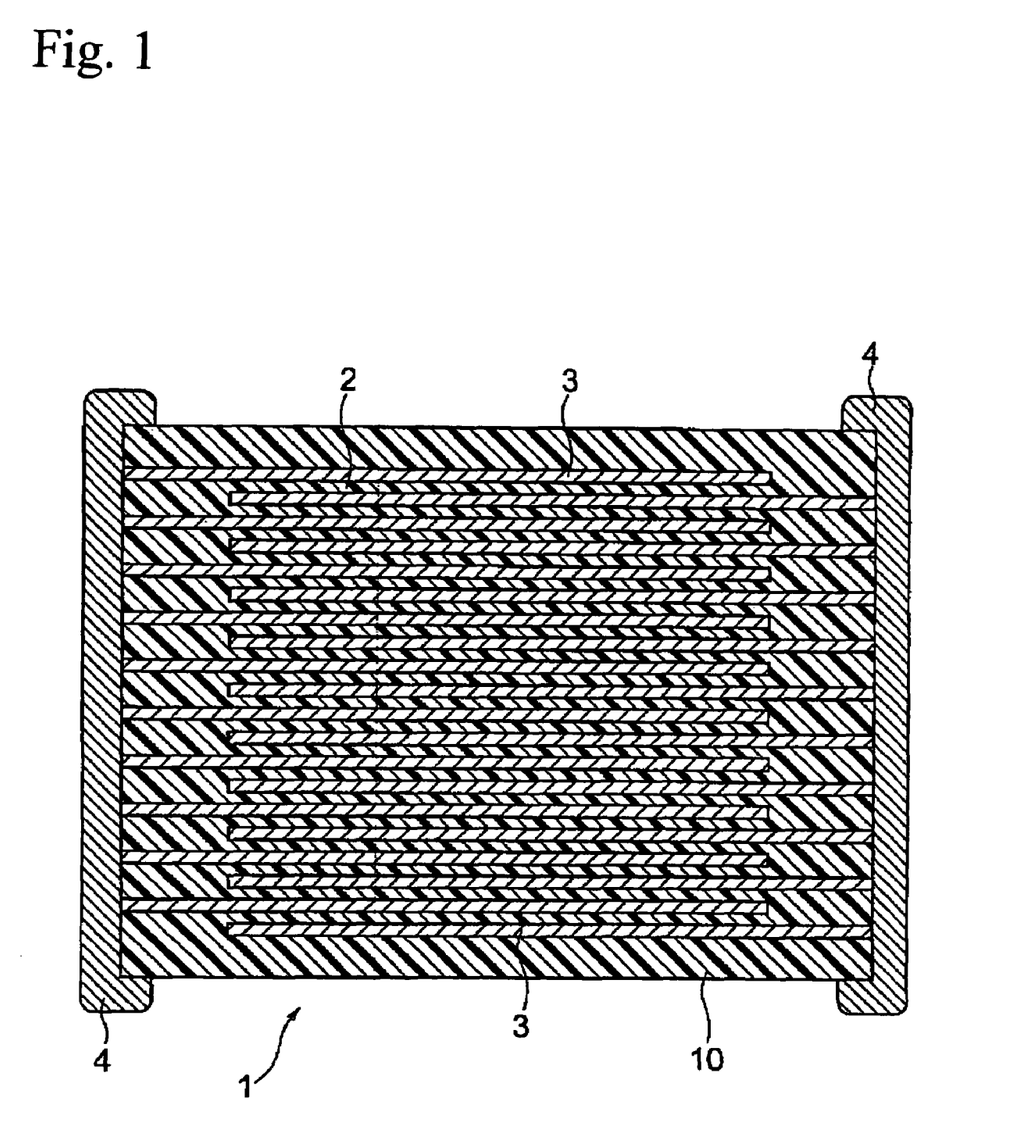
FIG. 1 is a cross-sectional view of a multilayer ceramic capacitor according to an embodiment of the present invention.

As shown in FIG. 1, a multilayer ceramic capacitor 1 according to an embodiment of the present invention comprises a capacitor element body 10, wherein dielectric layers 2 and internal electrode layers 3 are alternately stacked. Both end portions of the capacitor element body 10 are formed with a pair of external electrodes 4 respectively conducting to the internal electrode layers 3 arranged alternately in the element body 10. A shape of the capacitor element body 10 is not particularly limited, but is normally rectangular parallelepiped. Also, the size is not particularly limited and may be a suitable size in accordance with the use object.

The internal electrode layers 3 are stacked, so that the respective end surfaces are exposed alternately to surfaces of two facing end portions of the capacitor element body 10. The pair of external electrodes 4 are formed on both end portions of the capacitor element body 10 and connected to the exposed end surfaces of the alternately arranged internal electrode layers 3, so that a capacitor circuit is configured.

Dielectric Layer 2

The dielectric layers 2 comprise a dielectric ceramic composition.

In the present embodiment, the dielectric ceramic composition comprises a main component including barium titanate expressed by a composition formula of $Ba_mTiO_{2+m}$, wherein "m" satisfies $0.995 \leq m \leq 1.010$ and a ratio of Ba and Ti satisfies $0.995 \leq Ba/Ti \leq 1.010$, a fourth subcomponent including an oxide of R (note that R is at least one kind selected from Y, La, Ce, Pr, Nd, Pm, Sm, Eu, Gd, Tb, Dy, Ho, Er, Tm, Yb and Lu) and other subcomponents.

The fourth subcomponent is a subcomponent including an oxide of R. An R element of the oxide of R is at least one kind of element selected from Y, La, Ce, Pr, Nd, Pm, Sm, Eu, Gd, Tb, Dy, Ho, Er, Tm, Yb and Lu. Among them, Y, Pm, Sm, Eu, Gd, Tb, Dy, Ho, Er, Tm, Yb and Lu are preferable and Y, Tb and Yb are more preferable.

The fourth subcomponent has an effect of improving the IR accelerated lifetime characteristics. A content of the fourth subcomponent is preferably 0.1 to 10 moles in terms of R and, more preferably, 0.2 to 6 moles. When the content is too small, the effect of adding the fourth subcomponent cannot be obtained, and the capacity-temperature characteristic declines. On the other hand, when the content is too much, the sinterability tends to decline. Note that, as will be explained later on, in the production method of the present embodiment, a step of making at least a part of a material of the fourth subcomponent react with a material of the main component is applied.

In the present embodiment, it is preferable to furthermore comprise the first to third and fifth subcomponents below as subcomponents other than the fourth subcomponent.

Namely, a first subcomponent furthermore including at least one kind selected from MgO, CaO, BaO and SrO, a second subcomponent including mainly $SiO_2$ and at least one kind selected from MO (note that M is at least one kind selected from Mg, Ca, Ba and Sr), $Li_2O$ and $B_2O_3$, a third subcomponent including at least one kind selected from $V_2O_5$, $MoO_3$ and $WO_3$; and a fifth subcomponent including at least one kind selected from MnO and $Cr_2O_3$.

Ratios of the respective subcomponents with respect to 100 moles of the main component in terms of respective oxides are the first subcomponent: 0.1 to 5 moles
the second subcomponent: 0.1 to 12 moles
the third subcomponent: 0 to 0.3 mole (note that 0 is not included), and
the fifth subcomponent: 0.05 to 1.0 mole and more preferably,
the first subcomponent: 0.2 to 4 moles
the second subcomponent: 1 to 6 moles
the third subcomponent: 0 to 0.25 mole (note that 0 is not included), and
the fifth subcomponent: 0.05 to 0.4 mole In the present embodiment, as a result that the dielectric ceramic composition includes the first to third and fifth subcomponents explained above in addition to the fourth subcomponent including an oxide of R, the temperature characteristic of the capacitance can be improved and, preferably, the X7R characteristics (−55 to 125° C., ΔC=within ±15%) of the EIA standard can be satisfied.

Note that in this specification, the respective oxides composing the main component and respective subcomponents are expressed by stoichiometric compositions, but oxidation states of the oxides may be deviated from the stoichiometric compositions. Note that each of the ratios of the subcomponents above is obtained by converting a metal amount included in an oxide composing the subcomponent to an oxide of the stoichiometric composition.

The reason of limiting contents of the subcomponents is as below.

When a content of the first subcomponent (MgO, CaO, BaO and SrO) is too small, the capacity-temperature change rate becomes large. On the other hand, when the content is too large, it is liable that the sinterability declines and the high temperature load lifetime declines. Note that composition ratios of respective oxides in the first subcomponent may be any.

The second subcomponent includes $SiO_2$ as the main component and at least one kind selected from MO (note that M is at least one kind selected from Mg, Ca, Ba and Sr), $Li_2O$ and $B_2O_3$. The second subcomponent acts mainly as a sintering auxiliary agent. MO (note that M is at least one kind selected from Mg, Ca, Ba and Sr), which is also included in the first subcomponent, is made to have a lower melting point by being made to be a composite oxide with $SiO_2$ to be a compound expressed by a composition formula of $M_xSiO_{2+x}$. As a result that the melting point can be made low, the reactivity with the main component can be improved. Note that, for example, when using BaO and CaO as the MO, the composite oxide is preferably a compound expressed by a composition formula of $(Ba, Ca)_xSiO_{2+x}$. The "x" in $(Ba, Ca)_xSiO_{2+x}$ is preferably 0.8 to 1.2 and, more preferably, 0.9 to 1.1. When the "x" is too small, that is, when $SiO_2$ is too much, it reacts with the main component of $Ba_mTiO_{2+m}$ and deteriorates the dielectric characteristics. On the other hand, when the "x" is too large, the melting point becomes high and deteriorates the sinterability, which is unfavorable.

The third subcomponent ($V_2O_5$, $MoO_3$ and $WO_3$) exhibits an effect of flattening the capacity-temperature characteristic at the Curie's temperature or higher and an effect of improving the high temperature load lifetime. When a content of the third subcomponent is too small, the effects become insufficient. On the other hand, when the content is too large, the IR declines remarkably. Note that composition ratios of respective oxides in the third subcomponent may be any.

The fifth subcomponent (MnO and $Cr_2O_3$) have effects of shifting the Curie's temperature to the high temperature side, flattening the capacity-temperature characteristic, improving the insulation resistance (IR), improving the breakdown voltage and lowering the firing temperature, etc.

An average particle diameter of dielectric particles included in the dielectric ceramic composition is not particularly limited, but it is preferably 0.1 to 0.3 μm. When the average particle diameter is too small, the specific permittivity tends to become low, while when too large, a change of the specific permittivity over time tends to become large. The average particle diameter of the dielectric particles can be measured, for example, by the code method of measuring an average particle diameter by using a SEM image of the dielectric particles on an assumption that a shape of the dielectric particles is sphere.

A thickness of the dielectric layer 2 is not particularly limited, but is preferably 4.5 μm or thinner, more preferably 3.5 μm or thinner, and furthermore preferably 3.0 μm or thinner per one layer. The lower limit of the thickness is not particularly limited and is, for example, 0.5 μm or so.

The number of stacked layers of the dielectric layer 2 is not particularly limited, but is preferably 20 or more, more preferably 50 or more, and particularly preferably 100 or more. The upper limit of the number of stacked layers is not particularly limited and is, for example, 2000 or so.

Internal Electrode Layer 3

A conductive material included in the internal electrode layer 3 is not particularly limited, but since ceramic composition of the dielectric layer 2 has reduction-resistance, relatively inexpensive base metals may be used. As a base metal to be used as the conductive material, Ni or a Ni alloy is preferable. As the Ni alloy, an alloy of one or more kinds of elements selected from Mn, Cr, Co and Al with Ni is preferable, and a content of Ni in the alloy is preferably 95 wt % or more. Note that the Ni or Ni alloy may contain various trace components, such as P, by not more than 0.1 wt % or so. A thickness of the internal electrode layer 3 may be suitably determined in accordance with the use object, etc., but normally 0.1 to 3 μm is preferable and 0.2 to 2.0 μm or so is particularly preferable.

External Electrode 4

A conductive material included in the external electrode 4 is not particularly limited, and inexpensive Ni, Cu and alloys of these may be used in the present invention. A thickness of the external electrode 4 may be suitably determined in accordance with the use object, etc., but normally 10 to 50 μm or so is preferable.

Production Method of Multilayer Ceramic Capacitor

A multilayer ceramic capacitor of the present embodiment is produced by preparing a green chip by a normal printing method or sheet method using a paste, firing the same, then, printing or transferring external electrodes and firing in the same way as in a multilayer ceramic capacitor of the related art. Below, the production method will be explained specifically.

First, dielectric ceramic composition powder to be included in the dielectric layer paste is fabricated.

In the present embodiment, the dielectric ceramic composition powder is fabricated as below. First, a material of the main component and a part of a material of the fourth subcomponent (material corresponding to a part of the fourth subcomponent to be included in the dielectric ceramic composition) are brought to react in advance, preferably, to be in a solid dispersion state to obtain a reacted material. Next, the reacted material is added with remaining material of the fourth subcomponent (remaining material of the fourth subcomponent to compose the dielectric ceramic composition) and materials of the first to third and fifth subcomponents and, in accordance with need, preliminary fired, so that the dielectric ceramic composition powder is fabricated.

As the material of the main component, powder of the $Ba_mTiO_{2+m}$ explained above or powder of a compound to be $Ba_mTiO_{2+m}$ by firing may be used, and an average particle diameter of the main component material is preferably 0.05 to 0.5 μm and, more preferably, 0.1 to 0.4 μm. When an average particle diameter of the main component material is too large, an average crystal grain of the dielectric particles after sintering becomes too large and it is liable that the temperature characteristics deteriorate and the insulation resistance (IR) declines. On the other hand, when the average particle diameter is too small, it is liable that solid dispersion of oxides of R in the main component material becomes uneven. Note that, in the present embodiment, an average particle diameter means a volume-based cumulative 50% diameter (D50 diameter) and is measured by the method utilizing light scatter such as laser diffraction method, etc.

As the material of the main component and the material of the fourth subcomponent to be brought to react in advance, oxides of R explained above and a variety of compounds to be the oxides of R by firing may be used. As the oxides of R and compounds to be the oxides of R by firing, powder materials having an average particle diameter of 0.01 to 0.1 μm or so or sol materials mentioned below, etc. may be used.

The sol material is not particularly limited and, for example, hydroxide sol and oxide sol, etc. may be mentioned. Also, a sol particle diameter of the sol material is normally 1 to 100 nm or so and, as the solvent, water and organic solvents such as methanol, ethanol and other alcohols; xylene, toluene and other aromatic solvents; or methylethyl ketone and other ketones may be mentioned.

The compounds to be oxides of R by firing are not particularly limited and alcoxides of R and inorganic acid salts of R, etc. may be mentioned.

The alcoxide of R is a compound of alcohol and R element and, specifically, a compound, wherein hydrogen in a hydroxyl group of alcohol is substituted by an R element. The alcoxides of R is not particularly limited and a variety of compounds expressed by a general formula of $C_nH_{2n+1}OR$ ("n" is an integer from 1 to 9). For example, $CH_3OR$, $C_2H_5OR$, n-$C_3H_7OR$ and i-$C_3H_7OR$, etc. nay be mentioned.

Also, the inorganic acid salt of R is not particularly limited and, for example, chlorides, nitrates, phosphates and sulfates, etc. may be mentioned. Note that many of inorganic acid salts of R are in a hydrated state and normally used in a state of being dissolved in water or a water-soluble organic solvent, etc.

The material of the fourth subcomponent to react with the main component material in advance is preferably 0 to 0.5 mole (note that 0 is not included) and, more preferably, 0.01 to 0.2 mole in terms of R with respect to 100 moles of the main components.

Alternatively, the ratio of the fourth subcomponent material to be brought to react in advance is preferably 0 to 50 mol % (note that 0 and 50 are not included) in terms of R with respect to a total of 100 mol % to be finally included in the dielectric ceramic composition, more preferably 0 to 25 mol % (note that 0 is not included), and furthermore preferably 0 to 15 mol % (note that 0 is not included).

When an amount of the fourth component material to be brought to react with the main component material in advance is too large, crystal grain diameter of a sintered body to be obtained after firing becomes too large, and it is liable that the temperature characteristics decline and the insulation resistance (IR) declines.

As a method of obtaining the reacted material by making a part of the fourth subcomponent material react with the main component material in advance, a method of mixing the main component material and the fourth subcomponent materials by using a solvent, etc., evaporating the solvent and preliminarily firing and a method of adding a precipitating agent to the mixed solution, depositing the fourth subcomponent on the main component and preliminarily firing the result, etc. may be mentioned. Note that a temperature at the preliminary firing is preferably 500 to 700° C. or so.

Next, the obtained reacted material is added with the remaining fourth subcomponent material (remaining material of the fourth subcomponent to compose the dielectric ceramic composition) and the first to third and fifth subcomponent materials. Then, the result is mixed and, in accordance with need, preliminarily fired to obtain the dielectric ceramic composition powder. As the remaining fourth subcomponent material, first to third and fifth subcomponent materials, the oxides as above and the mixtures, composite oxides, and a variety of compounds to be the oxides and composite oxides by firing may be used.

Next, by using the obtained dielectric ceramic composition powder, a dielectric layer paste is produced. The dielectric layer paste may be an organic slurry obtained by kneading the dielectric ceramic composition powder and an organic vehicle or a water based slurry.

An organic vehicle is obtained by dissolving a binder in an organic solvent. The binder to be used for the organic vehicle is not particularly limited and may be suitably selected from a variety of normal binders, such as ethyl cellulose and polyvinyl butyral. Also, the organic solvent to be used is not particularly limited and may be suitably selected from a variety of organic solvents, such as terpineol, butyl carbitol, acetone, and toluene, in accordance with a method to be used, such as a printing method and sheet method.

Also, when using water based slurry as a dielectric layer paste, a water based vehicle obtained by dissolving a water-soluble binder and dispersant, etc. in water is kneaded with a dielectric material. The water-soluble binder used for the water based vehicle is not particularly limited and, for example, polyvinyl alcohol, cellulose and water-soluble acrylic resin, etc. may be used.

The internal electrode layer paste is fabricated by kneading a conductive material formed by the above variety of conductive metals and alloys or a variety of oxides, organic metal compounds, and resinates, etc., which become the above conductive material after firing, with the above organic vehicle.

The external electrode paste may be fabricated in the same way as that in the above internal electrode layer paste.

A content of the organic vehicle in the above pastes is not particularly limited and may be a normal content, for example, the binder is 1 to 5 wt % or so and the solvent is 10 to 50 wt % or so. Also, additives selected from a variety of dispersants, plasticizers, dielectrics and insulators, etc. may be included in each paste. A total content thereof is preferably 10 wt % or less.

When using a printing method, the dielectric layer paste and the internal electrode layer paste are stacked and printed on a substrate, such as PET, cut to be a predetermined shape and removed from the substrate to obtain a green chip.

Also, when using a sheet method, the dielectric layer paste is used to form a green sheet, the internal electrode layer paste is printed thereon, then, the results are stacked to obtain a green chip.

Before firing, binder removal processing is performed on the green chip. The binder removal condition is the temperature rising rate of preferably 5 to 300° C./hour and more preferably 10 to 100° C./hour, the holding temperature is preferably 180 to 400° C. and more preferably 200 to 300° C., and the temperature holding time is preferably 0.5 to 24 hours and more preferably 5 to 20 hours. Also, the firing atmosphere is preferably in the air.

Next, the green chip subjected to the binder removal processing is fired. An atmosphere when firing the green chip may be suitably determined in accordance with a kind of a conductive material in the internal electrode layer paste, and when using Ni, a Ni alloy and other base metal as the conductive material, the oxygen partial pressure in the firing atmosphere is preferably $10^{-9}$ to $10^{-4}$ Pa. When the oxygen partial pressure is lower than the above range, a conductive material in the internal electrode layer is abnormally sintered to be broken in some cases. While, when the oxygen partial pressure exceeds the above range, the internal electrode layer tends to be oxidized.

Also, the holding temperature at firing is preferably 1000 to 1400° C., and more preferably 1100 to 1350° C. When the holding temperature is lower than the above range, densification becomes insufficient, while when exceeding the above range, breakings of electrodes due to abnormal sintering of the internal electrode layer, deterioration of capacity-temperature characteristics due to dispersion of the internal electrode layer component, and reduction of the dielectric ceramic composition are easily caused.

As other firing conditions, the temperature rising rate is preferably 100 to 900° C./hour and more preferably 200 to 900° C./hour, the temperature holding time is preferably 0.5 to 8 hours and more preferably 1 to 3 hours, and the cooling rate is preferably 50 to 500° C./hour and more preferably 200 to 300° C./hour. Also, the firing atmosphere is preferably a reducing atmosphere and a preferable atmosphere gas is a wet mixed gas of $N_2$ and $H_2$.

When firing in a reducing atmosphere, it is preferable that annealing is performed on the capacitor element body. Annealing is processing for re-oxidizing the dielectric layer and the IR lifetime is remarkably elongated thereby, so that the reliability is improved.

An oxygen partial pressure in the annealing atmosphere is preferably $10^{-3}$ Pa or higher, and particularly preferably $10^{-2}$ to 10 Pa. When the oxygen partial pressure is lower than the above range, re-oxidization of the dielectric layer becomes difficult, while when exceeding the above range, the internal electrode layer tends to be oxidized.

The holding temperature at annealing is preferably 1200° C. or lower, and particularly preferably 500 to 1200° C. When the holding temperature is lower than the above range, oxidization of the dielectric layer becomes insufficient, so that the IR becomes low and the high temperature load lifetime becomes short easily. On the other hand, when the holding temperature exceeds the above range, not only the internal electrode layer is oxidized to reduce the capacity, but the internal electrode layer reacts with the dielectric base material, and deterioration of the capacity-temperature characteristic, a decline of the IR and a decline of the high temperature load lifetime are easily caused.

As other annealing conditions, the temperature rising time is preferably 100 to 900° C./hour and more preferably 200 to 900° C./hour, the temperature holding time is preferably 0.5 to 12 hours and more preferably 1 to 10 hours, and the cooling rate is preferably 50 to 600° C./hour and more preferably 100 to 300° C./hour. Also, a preferable atmosphere gas of annealing is, for example, a wet $N_2$ gas, etc.

In the above binder removal processing, firing and annealing, for example, a wetter, etc. may be used to wet the $N_2$ gas and mixed gas, etc. In this case, the water temperature is preferably 5 to 75° C. or so.

The binder removal processing, firing and annealing may be performed continuously or separately.

End surface polishing, for example, by barrel polishing or sand blast, etc. is performed on the capacitor element body obtained as above, and the external electrode paste is printed or transferred and fired to form external electrodes 4. A firing condition of the external electrode paste is preferably, for example, at 600 to 800° C. in a wet mixed gas of $N_2$ and $H_2$ for 10 minutes to 1 hour or so. A cover layer is formed by plating, etc. on the surface of the external electrodes 4 if necessary.

A multilayer ceramic capacitor of the present invention produced as above is mounted on a print substrate, etc. by soldering, etc. and used for a variety of electronic apparatuses, etc.

An embodiment of the present invention was explained above, but the present invention is not limited to the above embodiment and may be variously modified within the scope of the present invention.

For example, in the above embodiment, a multilayer ceramic capacitor was explained as an example of an electronic device according to the present invention, but an electronic device according to the present invention is not limited to the multilayer ceramic capacitor and may be any as far as it includes a dielectric layer composed of a dielectric ceramic composition having the above composition.

EXAMPLES

Below, the present invention will be explained based on furthermore detailed examples, but the present invention is not limited to the examples.

Example 1

First, the main component material ($BaTiO_3$) and $Y_2O_3$ powder as the fourth subcomponent material having an average particle diameter of 0.35 μm were prepared. Next, the prepared $BaTiO_3$ powder and $Y_2O_3$ powder were subjected to wet mixing/pulverizing by a ball mill to obtain slurry, and after drying the slurry, preliminary firing and pulverizing were performed, so that a reacted material was obtained. Note that the preliminary firing condition was the temperature rising rate of 200° C./hour, the holding temperature of 500° C., the temperature holding time of two hours and an atmosphere was in the air. An adding quantity of $Y_2O_3$ was 0.02 mole in terms of Y atom (it will be the same in examples, comparative examples and reference examples in this specification of the present invention below) with respect to 100 moles of the main component. Namely, it was 0.01 mole in terms of $Y_2O_3$.

Next, the first to fifth subcomponent described below were added to the obtained reacted material, subjected to wet mixing/pulverizing by a ball mill to obtain slurry, and after drying the slurry, preliminary firing and pulverizing were performed to obtain dielectric ceramic composition powder. Note that adding quantities of the respective subcomponents are in terms of respective oxides with respect to 100 moles of the main component (note that $Y_2O_3$ was an adding quantity in terms of Y atom).

MgO (first subcomponent: 1.2 moles
(Ba, Ca)$SiO_3$ (second subcomponent): 0.75 mole
$V_2O_5$ (third subcomponent): 0.03 mole
$Y_2O_3$ (fourth subcomponent): 0.38 mole
MnO (fifth subcomponent): 0.2 mole 100 parts by weight of the obtained dielectric ceramic composition powder, 4.8 parts by weight of an acrylic resin, 100 parts by weight of ethyl acetate, 6 parts by weight of mineral spirit and 4 parts by weight of toluene were mixed by a ball mill to be a paste, so that a dielectric layer paste was obtained.

Next, 44.6 parts by weight of Ni particles, 52 parts by weight of terpineol, 3 parts by weight of ethyl cellulose and 0.4 part by weight of benzotriazole were kneaded by triple rolls to be slurry, so that an internal electrode paste was obtained.

These pastes were used as below to produce a multilayer ceramic chip capacitor 1 shown in FIG. 1.

First, by using the obtained dielectric layer paste, a green sheet was formed on a PET film, after printing the internal electrode layer paste thereon, the sheet was removed from the PET film. Next, the green sheets and protective green sheets (not printed with the internal electrode layer paste) were stacked and bonded with pressure to obtain a green chip.

Next, the green chip was cut to be a predetermined size and subjected to binder removal processing, firing and annealing under the conditions below, so that a multilayer ceramic sintered body was obtained.

The binder removal processing condition was the temperature rising rate of 32.5° C./hour, the holding temperature of 260° C., the temperature holding time of 8 hours, and the atmosphere of in the air.

The firing condition was the temperature rising rate of 200° C./hour, the holding temperature of 1260 to 1280° C., the temperature holding time of 2 hours, cooling rate of 200° C./hour and the atmosphere of wet mixed gas of $N_2$ and $H_2$ (the oxygen partial pressure was $10^{-7}$ Pa).

The annealing condition was the temperature rising rate of 200° C./hour, the holding temperature of 1050° C., the temperature holding time of 2 hours, cooling rate of 200° C./hour and the atmosphere of wet $N_2$ gas (the oxygen partial pressure was 1.01 Pa).

Note that a wetter, wherein the water temperature was 20° C., was used to wet the atmosphere gas at the time of firing and annealing.

Next, after polishing end surfaces of the obtained multilayer ceramic sintered body by sand blasting, In—Ga was applied as external electrodes, so that samples of the multilayer ceramic capacitor in example 1 shown in FIG. 1 were obtained.

A size of the obtained capacitor samples was 3.2 mm×1.6 mm×0.6 mm, the number of dielectric layers sandwiched by internal electrode layers was 4, a thickness (a thickness between layers) of one dielectric layer was 4.5 μm, and a thickness of one internal electrode layer was 1.2 μm. Next, evaluation was made on obtained capacitor samples as to an average crystal grain diameter, specific permittivity ε, dielectric loss tan δ, insulation resistance IR, CR product, temperature characteristics of capacitance and IR accelerated lifetime. Also, a distribution degree of Y element was measured by XPS measurement on the reacted material as above.

Average Crystal Grain Diameter of Dielectric Particles

As a measuring method of an average particle diameter of the dielectric particles, first, an obtained capacitor sample was cut on a plane vertical to the internal electrodes and the cut surface was polished. Then, after performing chemical etching on the polished surface, it was observed by using a scanning electron microscope (SEM) and calculation based on the code method was made on an assumption that a shape of the dielectric particles was sphere. The results are shown in Table 1.

Specific Permittivity ε

A capacitance C was measured on the capacitor samples at a reference temperature of 20° C. by using a digital LCR meter (YHP4274A made by Yokogawa Electric Corporation) under a condition of a frequency of 120 Hz and an input signal level (measuring voltage) of 0.5 Vrms/μm. Then, the specific permittivity (no unit) was calculated from the obtained capacitance, a thickness of a dielectric of the multilayer ceramic capacitor and an area that the internal electrodes superimpose. The higher the specific permittivity is, the more preferable. The results are shown in Table 1.

Dielectric Loss tan δ

A dielectric loss tan δ was measured on the capacitor samples at the reference temperature of 20° C. by using a digital LCR meter (YHP4274A made by Yokogawa Electric Corporation) under a condition of a frequency of 120 Hz and an input signal level (measuring voltage) of 0.5 Vrms/μm. The lower the dielectric loss is, the more preferable. The results are shown in Table 1.

Insulation Resistance IR

An insulation resistance IR was measured on the capacitor samples after applying a direct current voltage of 4V/μm for one minute at 20° C. by using an insulation resistance tester (R8340A made by Advantest Corporation). The larger the insulation resistance IR is, the more preferable. The results are shown in Table 1.

CR Product

A CR product was measured by obtaining a product of a capacitance C (unit is μF) and an insulation resistance IR (unit is MΩ) measured as above. The larger the CR product is, the more preferable. The results are shown in Table 1.

Temperature Characteristics of Capacitance

A capacitance at −55 to 125° C. was measured on the capacitor samples, a change rate ΔC of the capacitance was calculated, and an evaluation was made whether the X7R characteristics of the EIA standard were satisfied. Namely, whether the change rate ΔC was within ±15% at −55 to 125° C. was evaluated. The results are shown in Table 1. Note that samples satisfied the X7R characteristics were given "O" (good) and samples not satisfied were given "x" (not good) in Table 1.

IR Accelerated Lifetime

An acceleration test was conducted on the capacitor samples at 180° C. under an electric field of 20V/μm, and time (unit is hour) taken by the insulation resistance IR to become $10^8$ Ω or lower was calculated. The longer the IR accelerated lifetime is, the more preferable. The results are shown in Table 1.

Measurement of Distribution Degree of Y atoms in Reacted Material

A distribution state of each of elements of Ba, Ti and Y in the surface depth direction was measured by the XPS measurement on the reacted material obtained by making $BaTiO_3$ powder react with $Y_2O_3$ powder in advance. From the XPS measurement results, the respective elements of Ba, Ti and Y distributed almost at the same concentration from near the surface of the reacted material to inside thereof and it was confirmed that the solid dispersion reaction proceeded uniformly.

Examples 2 to 4

Capacitor samples of examples 2 to 4 were obtained by obtaining dielectric ceramic composition powder in the same way as that in the example 1 except for the points explained below when producing the dielectric ceramic composition powder.

Namely, in the examples 2 to 4, first, an amount of $Y_2O_3$ to be brought to react with the main component material (BaTiO$_3$) in advance was changed from that in the example 1 to 0.05 mole (the example 2), 0.10 mole (the example 3) and 0.15 mole (the example 4) and reacted materials were obtained, respectively. Then, an amount of $Y_2O_3$ to be added (afterward) to the obtained reacted materials was changed from that in the example 1 to 0.35 mole (the example 2), 0.30 mole (the example 3) and 0.25 mole (the example 4), respectively.

An average crystal grain diameter, specific permittivity $\epsilon$, dielectric loss tan $\delta$, insulation resistance IR, CR product, temperature characteristics of the capacitance and IR accelerated lifetime were evaluated on the obtained capacitor samples in the same way as in the example 1. The results are shown in Table 1.

Comparative Example 1

Capacitor samples of a comparative example 1 were obtained by obtaining dielectric ceramic composition powder in the same way as that in the example 1 except for the points explained below when producing the dielectric ceramic composition powder.

Namely, in the comparative example 1, without making the main component material (BaTiO$_3$) and $Y_2O_3$ react to each other in advance, the main component material and materials of the first to fifth subcomponents were mixed directly and preliminary firing and pulverizing were performed to obtain dielectric ceramic composition powder. Note that an adding quantity of $Y_2O_3$ was 0.40 mole in the comparative example 1.

Comparative Example 2

Capacitor samples of examples 2 were obtained by obtaining dielectric ceramic composition powder in the same way as that in the example 2 except for the points explained below when producing the dielectric ceramic composition powder.

Namely, in the comparative example 2, first, an amount of $Y_2O_3$ to be brought to react with the main component material (BaTiO$_3$) in advance was changed from that in the example 1 to 0.25 mole and a reacted material was obtained. Then, an amount of $Y_2O_3$ to be added (afterward) to the obtained reacted material was changed from that in the example 1 to 0.15 mole.

An average crystal grain diameter, specific permittivity $\epsilon$, dielectric loss tan $\delta$, insulation resistance IR, CR product, temperature characteristics of the capacitance and IR accelerated lifetime were evaluated on the obtained capacitor samples in the same way as in the example 1. The results are shown in Table 1.

Reference Example 1

Capacitor samples of a reference example 1 were obtained by obtaining dielectric ceramic composition powder in the same way as that in the example 1 except for the points explained below when producing the dielectric ceramic composition powder.

Namely, in the reference example 1, first, an amount of $Y_2O_3$ to be brought to react with the main component material (BaTiO$_3$) in advance was changed from that in the example 1 to 0.40 mole and a reacted material was obtained. Then, being different from the example 1, $Y_2O_3$ as the fourth subcomponent was not added to the obtained reacted material to obtain dielectric ceramic composition powder.

An average crystal grain diameter, specific permittivity $\epsilon$, dielectric loss tan $\delta$, insulation resistance IR, CR product, temperature characteristics of the capacitance and IR accelerated lifetime were evaluated on the obtained capacitor samples in the same way as in the example 1. The results are shown in Table 1.

TABLE 1

| | Adding Quantity (mole) of Fourth Subcomponent | | Sintered Body Crystal Grain | | | | CR | | IR |
| --- | --- | --- | --- | --- | --- | --- | --- | --- | --- |
| | Adding First ($Y_2O_3$) | Adding Later ($Y_2O_3$) | Diameter [μm] | Permittivity $\epsilon$ | tan $\delta$ [%] | IR [Ω · m] | Product [μF · MΩ] | X7R Characteristics | Lifetime [h] |
| Comparative Example 1 | 0 | 0.40 | 0.29 | 3400 | 4.6 | 1.20E+11 | 3610 | o | 0.8 |
| Example 1 | 0.02 | 0.38 | 0.30 | 4000 | 6.8 | 1.20E+11 | 4250 | o | 1.1 |
| Example 2 | 0.05 | 0.35 | 0.31 | 4800 | 8.2 | 1.24E+11 | 5270 | o | 1.6 |
| Example 3 | 0.10 | 0.30 | 0.31 | 4928 | 11.7 | 1.20E+11 | 5240 | o | 0.8 |
| Example 4 | 0.15 | 0.25 | 0.35 | 4600 | 10.0 | 1.20E+11 | 4890 | o | 0.16 |
| Comparative Example 2 | 0.25 | 0.15 | 0.37 | 4400 | 12.5 | 1.16E+11 | 4520 | x | 0.08 |
| Reference Example 1 | 0.40 | 0 | 0.78 | 5550 | 25.2 | 2.80E+10 | 1380 | x | 0.10 |

"mE+n" means "m × 10$^{+n}$" in Table.

Evaluation 1

Table 1 shows an average crystal grain diameter, specific permittivity ε, dielectric loss tan δ, insulation resistance IR, CR product, temperature characteristics of the capacitance and IR accelerated lifetime of each of the examples 1 to 4, the comparative examples 1 and 2 and the reference example 1. Note that "mE+n" of insulation resistance IR indicates "m×10$^{+n}$" in Table 1.

From Table 1, in the capacitor samples of the examples 1 to 4 obtained by making a part of $Y_2O_3$ react with the main component to obtain a reacted material and, then, adding the remaining $Y_2O_3$ to the obtained reacted material, a high specific permittivity of 4000 or higher was attained in all cases and it was confirmed that other electric characteristics (dielectric loss tan δ, insulation resistance IR, CR product, temperature characteristics of the capacitance and IR accelerated lifetime) became also preferable.

On the other hand, in the comparative example 1, wherein the main component and $Y_2O_3$ were not brought to react in advance, the specific permittivity became low as 3400 and it was confirmed to be difficult to attain downsizing and a larger capacity.

Furthermore, in the reference example 1, wherein an amount of $Y_2O_3$ to be brought to react with the main component was 0.40 mole and no more $Y_2O_3$ was added to the obtained reacted material, an average crystal grain particle of the dielectric particles after sintering became large as 0.78 μm, and the results showed that the dielectric loss, insulation resistance, temperature characteristics of the capacitance and IR accelerated lifetime became poor.

From the results above, by comparing the examples 1 to 4 with the comparative examples 1 and 2, it was confirmed that the specific permittivity could be made high while maintaining preferable electric characteristics (dielectric loss tan δ, insulation resistance IR, CR product, temperature characteristics of the capacitance and IR accelerated lifetime) by making the main component and a part of the fourth subcomponent ($Y_2O_3$) react with each other in advance. Also, by comparing the examples 1 to 4 with the reference example 1, it was confirmed that it was preferable to bring the main component and a part of the fourth subcomponent ($Y_2O_3$) react with each other in advance, to set an amount of the fourth subcomponent ($Y_2O_3$) in the preferable range of the present invention explained above when producing the reacted material and, furthermore, to add the remaining fourth subcomponent ($Y_2O_3$) to the obtained reacted material.

Examples 5 to 8, Comparative Example 3 and Reference Example 2

Other than using $Tb_2O_3$ instead of $Y_2O_3$ as the fourth subcomponent material to be brought to react with the main component material, capacitor samples of examples 5 to 8, a comparative example 3 and a reference example 2 were produced in the same way as that in the example 1 to 4, comparative example 2 and reference example 1. Namely, in the examples 5 to 8, comparative example 3 and reference example 2, $Tb_2O_3$ was used as the fourth subcomponent material (to be added first) to be brought to react in advance and $Y_2O_3$ was used as the fourth subcomponent material to be added (afterward) to the reacted material. An average crystal grain diameter, specific permittivity ε, dielectric loss tan δ, insulation resistance IR, CR product, temperature characteristics of the capacitance and IR accelerated lifetime were evaluated on the obtained capacitor samples in the same way as in the example 1. The results are shown in Table 2.

TABLE 2

| | Adding Quantity (mole) of Fourth Subcomponent | | Sintered Body Crystal Grain | | | | CR | | IR |
|---|---|---|---|---|---|---|---|---|---|
| | Adding First ($Tb_2O_3$) | Adding Later ($Y_2O_3$) | Diameter [μm] | Permittivity ε | tan δ [%] | IR [Ω·m] | Product [μF·MΩ] | X7R Characteristics | Lifetime [h] |
| Example 5 | 0.02 | 0.38 | 0.29 | 3640 | 6.5 | 1.32E+11 | 4250 | ○ | 1.1 |
| Example 6 | 0.05 | 0.35 | 0.30 | 4650 | 8.6 | 1.32E+11 | 5440 | ○ | 1.5 |
| Example 7 | 0.10 | 0.30 | 0.30 | 4800 | 12.1 | 1.24E+11 | 5270 | ○ | 0.9 |
| Example 8 | 0.15 | 0.25 | 0.34 | 4800 | 11.1 | 1.16E+11 | 4930 | ○ | 0.20 |
| Comparative Example 3 | 0.25 | 0.15 | 0.37 | 4500 | 13.3 | 1.16E+11 | 4620 | x | 0.07 |
| Reference Example 2 | 0.40 | 0 | 0.84 | 6200 | 28.4 | 2.48E+10 | 1360 | x | 0.05 |

"mE+n" means "m × 10$^{+n}$" in Table.

Evaluation 2

Table 2 shows an average crystal grain diameter, specific permittivity ε, dielectric loss tan δ, insulation resistance IR, CR product, temperature characteristics of the capacitance and IR accelerated lifetime of each of the examples 5 to 8, the comparative example 3 and the reference example 2. Note that an adding quantity of $Tb_2O_3$ was expressed in terms of Tb atom in the same way as in $Y_2O_3$.

From Table 2, also in the case of using $Tb_2O_3$ instead of $Y_2O_3$ as the fourth subcomponent to be brought to react with the main component material, it was confirmed that the same tendency could be obtained.

Examples 9 to 12, Comparative Example 4 and Reference Example 3

Other than using $Yb_2O_3$ instead of $Y_2O_3$ as the fourth subcomponent material to be brought to react with the main component material in advance, capacitor samples of examples 9 to 12, a comparative example 4 and a reference example 3 were produced in the same way as that in the examples 1 to 4, comparative example 2 and reference example 1. Namely, in the examples 9 to 12, comparative example 4 and reference example 3, $Yb_2O_3$ was used as the fourth subcomponent material (to be added first) to be brought to react in advance and $Y_2O_3$ was used as the fourth subcomponent material to be added (afterward) to the reacted material. An average crystal grain diameter, specific permittivity $\epsilon$, dielectric loss tan $\delta$, insulation resistance IR, CR product, temperature characteristics of the capacitance and IR accelerated lifetime were evaluated on the obtained capacitor samples in the same way as in the example 1. The results are shown in Table 3.

Examples 13 to 16

Other than using $Dy_2O_3$, $Ho_2O_3$, $Gd_2O_3$ and $Eu_2O_3$ instead of $Y_2O_3$ as the fourth subcomponent material to be brought to react with the main component material in advance, capacitor samples of examples 13 to 16 were produced in the same way as that in the example 2. Namely, $Dy_2O_3$ was used as the fourth subcomponent material (to added first) to be brought to react in advance in the example 13, $Ho_2O_3$ was

TABLE 3

|  | Adding Quantity (mole) of Fourth Subcomponent | | Sintered Body Crystal Grain | | | | CR | | | IR |
| --- | --- | --- | --- | --- | --- | --- | --- | --- | --- | --- |
|  | Adding First ($Yb_2O_3$) | Adding Later ($Y_2O_3$) | Diameter [μm] | Permittivity $\epsilon$ | tan $\delta$ [%] | IR [$\Omega \cdot m$] | Product [μF · MΩ] | X7R Characteristics | | Lifetime [h] |
| Example 9 | 0.02 | 0.38 | 0.31 | 3700 | 6.2 | 1.48E+11 | 4850 | ○ | | 1.2 |
| Example 10 | 0.05 | 0.35 | 0.31 | 4500 | 8.5 | 1.48E+11 | 5900 | ○ | | 1.3 |
| Example 11 | 0.10 | 0.30 | 0.34 | 4300 | 10.2 | 1.40E+11 | 5330 | ○ | | 1.0 |
| Example 12 | 0.15 | 0.25 | 0.35 | 4500 | 10.5 | 1.32E+11 | 5260 | ○ | | 1.0 |
| Comparative Example 4 | 0.25 | 0.15 | 0.36 | 4700 | 11.0 | 1.20E+11 | 4990 | x | | 0.07 |
| Reference Example 3 | 0.40 | 0 | 0.65 | 5500 | 17.0 | 3.56E+10 | 1730 | x | | 0.06 |

"mE+n" means "m × 10$^{+n}$" in Table.

Evaluation 3

Table 3 shows an average crystal grain diameter, specific permittivity $\epsilon$, dielectric loss tan $\delta$, insulation resistance IR, CR product, temperature characteristics of the capacitance and IR accelerated lifetime of each of the examples 9 to 12, the comparative example 4 and the reference example 3. Note that an adding quantity of $Yb_2O_3$ was expressed in terms of Yb atom in the same way as in $Y_2O_3$.

From Table 3, also in the case of using $Yb_2O_3$ instead of $Y_2O_3$ as the fourth subcomponent to be brought to react with the main component material, it was confirmed that the same tendency could be obtained.

used as the fourth subcomponent material (to be added first) to be brought to react in advance in the example 14, $Gd_2O_3$ was used as the fourth subcomponent material (to be added first) to be brought to react in advance in the example 15, and $Eu_2O_3$ was used as the fourth subcomponent material (to be added first) to be brought to react in advance in the example 16. In all cases of the examples 13 to 16, $Y_2O_3$ was used as the fourth subcomponent material to be added (afterward) to the reacted material. An average crystal grain diameter, specific permittivity $\epsilon$, dielectric loss tan $\delta$, insulation resistance IR, CR product, temperature characteristics of the capacitance and IR accelerated lifetime were evaluated on the obtained capacitor samples in the same way as in the example 1. The results are shown in Table 4.

TABLE 4

|  | Fourth Subcomponent | | | | Sintered Body Crystal | | | | | | |
| --- | --- | --- | --- | --- | --- | --- | --- | --- | --- | --- | --- |
|  | Adding First | | Adding later | | | | | | | | |
|  | Adding Compound | Adding Quantity [mol] | Adding Compound | Adding Quantity [mol] | Grain Diameter [μm] | Permittivity $\epsilon$ | tan $\delta$ [%] | IR [$\Omega \cdot m$] | CR Product [μF · MΩ] | X7R Characteristics | IR Lifetime [h] |
| Example 13 | $Dy_2O_3$ | 0.05 | $Y_2O_3$ | 0.35 | 0.32 | 3700 | 6.2 | 1.48E+11 | 4850 | ○ | 1.6 |
| Example 14 | $Ho_2O_3$ | 0.05 | $Y_2O_3$ | 0.35 | 0.30 | 4500 | 8.5 | 1.48E+11 | 5900 | ○ | 1.3 |
| Example 15 | $Gd_2O_3$ | 0.05 | $Y_2O_3$ | 0.35 | 0.33 | 4600 | 10.2 | 1.40E+11 | 5700 | ○ | 2.0 |
| Example 16 | $Eu_2O_3$ | 0.05 | $Y_2O_3$ | 0.35 | 0.31 | 3800 | 10.5 | 1.32E+11 | 4440 | ○ | 1.8 |

"mE+n" means "m × 10$^{+n}$" in Table.

Evaluation 4

Table 4 shows an average crystal grain diameter, specific permittivity $\epsilon$, dielectric loss tan $\delta$, insulation resistance IR, CR product, temperature characteristics of the capacitance and IR accelerated lifetime of each of the examples 13 to 16. Note that adding quantities of $Dy_2O_3$, $Ho_2O_3$, $Gd_2O_3$ and $Eu_2O_3$ were expressed in terms of the respective atoms in the same way as in $Y_2O_3$.

From Table 4, also in the cases of using the above rare earth oxides instead of $Y_2O_3$ as the fourth subcomponent to be brought to react in advance, the same results as those in the case of $Y_2O_3$ were obtained.

What is claimed is:

1. A production method of a dielectric ceramic composition for producing a dielectric ceramic composition comprising
    a main component including barium titanate and
    a fourth subcomponent including an oxide of R, wherein R is at least one selected from the group consisting of Y, La, Ce, Pr, Nd, Pm, Sm, Eu, Gd, Th, Dy, Ho, Er, Tm, Yb and Lu, comprising the steps of:
    preparing a reacted material obtained by making the material of the main component react with a part of the material of the fourth subcomponent to be included in the dielectric ceramic composition; and
    adding remaining material of the fourth subcomponent to be included in the dielectric ceramic composition to the reacted material,
    wherein a content of the fourth subcomponent to be brought to react with a material of the main component in advance is 0.01 to 0.2 mole in terms of R with respect to 100 moles of the main component.

2. The production method of a dielectric ceramic composition as set forth in claim 1, wherein the reacted material is obtained by making the material of the main component react with the part of the material of the fourth subcomponent into a solid solution state.

3. The production method of a dielectric ceramic composition as set forth in claim 1, wherein a content of said fourth subcomponent in said dielectric ceramic composition to be obtained finally is 0.1 to 10 moles in terms of R with respect to 100 moles of said main component.

4. The production method of a dielectric ceramic composition as set forth in claim 1, wherein a ratio of said fourth subcomponent to be brought to react with a material of said main component in advance is greater than 0 to less than 50 mol % in terms of R with respect to 100 mol % as a total amount of said fourth subcomponent to be finally included in said dielectric ceramic composition.

5. The production method of a dielectric ceramic composition as set forth in claim 1, wherein:
    said dielectric ceramic composition furthermore comprises
    a first subcomponent including at least one selected from the group consisting of MgO, GaO, BaG and SrO,
    a second subcomponent including mainly $SiO_2$ and at least one selected from the group consisting of MO, wherein M is at least one selected from the group consisting of Mg, Ca, Ba and Sr, $Li_2O$ and $B_2O_3$, and
    a third subcomponent including at least one selected from the group consisting of $V_2O_5$, $MoO_3$ and $WO_3$; and
    ratios of the respective subcomponents with respect to 100 moles of said main component are
    the first subcomponent: 0.1 to 5 moles,
    the second subcomponent: 0.1 to 12 moles, and
    the third subcomponent: greater than zero and less than or equal to 0.3.

6. The production method of a dielectric ceramic composition as set forth in claim 5, wherein
    said dielectric ceramic composition furthermore comprises a fifth subcomponent including at least one selected from MnO and $Cr_2O_3$, and
    a ratio of the fifth subcomponent with respect to 100 moles of said main component is 0.05 to 1.0 mole.

7. The production method of a dielectric ceramic composition as set forth in claim 1, wherein a material having an average particle diameter of 0.05 to 0.5 µm is used as a material of said main component.

* * * * *